United States Patent [19]

Okabe et al.

[11] Patent Number: 5,554,571
[45] Date of Patent: Sep. 10, 1996

[54] PRODUCTION OF DIELECTRIC CERAMIC MATERIAL POWDER

[75] Inventors: Shinsei Okabe, Takatsuki; Sakiko Iwamoto, Nagaokakyo; Harunobu Sano, Kyoto, all of Japan

[73] Assignee: Murata Manufacturing Co., Ltd., Japan

[21] Appl. No.: 538,335

[22] Filed: Oct. 3, 1995

[30] Foreign Application Priority Data

Oct. 3, 1994 [JP] Japan ................................. 6-239058

[51] Int. Cl.⁶ .............................................. C04B 35/49
[52] U.S. Cl. ................................. 501/138; 501/139
[58] Field of Search ............................... 501/138, 139

[56] References Cited

U.S. PATENT DOCUMENTS

| | | | |
|---|---|---|---|
| 4,643,984 | 2/1987 | Abe et al. | 501/138 |
| 5,017,534 | 5/1991 | Chaput et al. | 501/138 |
| 5,296,425 | 3/1994 | Chazoro et al. | 501/138 |

FOREIGN PATENT DOCUMENTS

| | | | |
|---|---|---|---|
| 0224807 | 6/1987 | European Pat. Off. | C04B 35/49 |
| 63-151676 | 6/1988 | Japan | C04B 35/49 |
| 5-97515 | 4/1993 | Japan | C04B 35/49 |
| 5-306121 | 11/1993 | Japan . | |

*Primary Examiner*—David Brunsman
*Attorney, Agent, or Firm*—Ostrolenk, Faber, Gerb & Soffen, LLP

[57] ABSTRACT

Powder of dielectric ceramic materials is produced by preparing a main component $Ba(Ti_{1-x-y}Zr_xHf_y)O_3$ allowing barium hydroxide, at least one titanium compound, at least one zirconium compound and at least one hafnium compound to react with one another by condensation by catalytic actions of a base selected from the group consisting of alkali and amines; preparing a complex hydroxide of at least one rare earth element and manganese by allowing at least one rare earth element compound and a manganese compound to react with a base selected from the group consisting of alkali and amines in an aqueous solution; preparing at least one carbonate of calcium and magnesium by allowing at least one compound of calcium compounds and magnesium compounds to react with carbonate ions in an aqueous solution; mixing all the precipitates, and drying and thermally treating the resultant mixture.

12 Claims, No Drawings

PRODUCTION OF DIELECTRIC CERAMIC MATERIAL POWDER

BACKGROUND OF THE INVENTION

1. Field of the Invention

The present invention relates to production of dielectric ceramic material powders and, more particularly, to a method for producing powder of dielectric ceramic materials with a complex perovskite crystal structure.

2. Description of the Prior Art

For production of powder of dielectric ceramic materials composed of a main component consisting of $Ba(Ti_{1-x-y}Zr_xHf_y)O_3$, where $0.05 \leq x \leq 0.25$ and $0 \leq y \leq 0.05$), and additives including at least one of Ca and Mg, at least one rare earth element, and Mn, a powder method has generally been used comprising the steps of weighing out and mixing powders of carbonates and/or oxides of all the metal elements constituting dielectric ceramics, such as, for example, barium carbonate, titanium oxide, zirconium oxide, hafnium oxide, calcium carbonate, magnesium carbonate, lanthanum oxide and manganese carbonate, grinding the resultant mixture by the wet-process, dehydrating and drying the ground mixture, calcining the dried powder at a high temperature of 1200° C. and above, and mechanically grinding the resultant clinker to prepare powder of dielectric ceramic materials.

However, the above method includes the following problems awaiting a solution. Firstly, it is impossible with the above method to homogeneously mix these constituents of dielectric ceramics with one another at the molecular levels since the constituents are mixed in the powder form of carbonates or oxides. In other words, it is impossible to obtain microscopically homogeneous powder of dielectric ceramic materials. For this reason, when producing dielectric ceramic products with powder of the dielectric ceramic materials of the prior art, it is necessary to fire green products at temperatures of 1300° C. and above.

In addition, the dielectric ceramic material powder has been prepared by calcination at high temperatures of more than 1200° C., resulting in aggregation of particles of the dielectric ceramic material. As a result, it is necessary to crush the calcined powder with a grinding machine having a large shearing force, resulting in introduction of impurities produced by wear of grinding media or inner walls of the grinding machine.

SUMMARY OF THE INVENTION

It is therefore an object of the present invention to provide a method for producing dielectric ceramic material powders, which overcomes the aforesaid disadvantages and makes it possible to produce dielectric ceramic material powders easily sinterable at lower temperatures, said dielectric ceramic material powders having a composition composed of a main component of $Ba(Ti_{1-x-y}Zr_xHf_y)O_3$, where $0.05 \leq x \leq 0.25$ and $0 \leq y \leq 0.05$, and containing, as additives, at least one element of calcium and magnesium, at least one rare earth element, and manganese.

The above and other objects are achieved by the present invention which provides a method for producing dielectric ceramic material powders having a composition composed of a main component of $Ba(T_{1-x-y}Zr_xHf_y)O_3$, where $0.05 \leq x \leq 0.25$ and $0 \leq y \leq 0.05$, and containing, as additives, at least one element of calcium and magnesium, at least one rare earth element, and manganese, said method comprising:

a first step of allowing barium hydroxide, at least one titanium compound, at least one zirconium compound and at least one hafnium to react with one another in an aqueous solution at 65° to 95° C. by catalytic actions of a base selected from the group consisting of alkali and amines to form a main component $Ba(Ti_{1-x-y}Zr_xHf_y)O_3$, said at least one titanium compound being selected from the group consisting of hydrolyzable titanium-containing organic compounds, titanium hydroxide and titania sol, said at least one zirconium compound being selected from the group consisting of hydrolyzable zirconium-containing organic compounds, zirconium hydroxide and zirconia sol, said at least one hafnium compound being selected from the group consisting of hydrolyzable hafnium-containing organic compounds, hafnium hydroxide and hafnia sol;

a second step of allowing at least one rare earth element compound and a manganese compound to react with one another in an aqueous solution by catalytic actions of a base selected from the group consisting of alkali and amines to form a complex hydroxide of at least one rare earth element and manganese;

a third step of allowing at least one compound of calcium compounds and magnesium compounds to react with carbonate ions in an aqueous solution to form at least one carbonate of calcium and magnesium;

a fourth step of mixing respective precipitates prepared in said first to third steps by the wet process, drying and then thermally treating the resultant mixture.

In a preferred embodiment, raw materials used in the first step are so mixed that a molar ratio of barium hydroxide, a sum of titanium, zirconium and hafnium compounds, and base is 1:1:1–4. In this case, it is preferred to allow barium hydroxide, at least one titanium compound, at least one zirconium compound and at least one hafnium to react with one another at 65° to 95° C. to form a perovskite compound.

Further, it is preferred to precipitate barium ions as carbonate by incorporating at least one alkaline carbonate or by bubbling carbon dioxide into the reaction product in the first step after precipitating the main component $Ba(Ti_{1-x-y}Zr_xHf_y)O_3$. The alkaline carbonate to be used may be selected from the group consisting of $Na_2CO_3$, $K_2CO_3$, $Li_2CO_3$ and $(NH_4)_2CO_3$.

In another preferred embodiment, it is preferred to incorporate a titanium compound into the reaction mixture in the second step to allow it to react with alkali to form a complex hydroxide along with rare earth element and manganese. In this case, an added amount of the titanium compound is so determined that the number of moles of titanium atoms contained therein corresponds to a sum of the number of moles of rare earth element atoms in the rare earth element compounds used in the second step and the number of moles of Ca and Mg atoms in the Ca and Mg compound to be added in the third step.

In another preferred embodiment, the dried mixture prepared in the fourth step is thermally treated at a temperature ranging from 950° to 1100° C.

As the compounds of Ti, Zr and Hf to be used as raw material, there may be used any hydrolyzable organic compounds of containing titanium, zirconium or hafnium. Typical compounds are titanium alkoxide, zirconium alkoxide, and hafnium alkoxide.

As the alkoxides, it is preferred to use an alkoxide including an alkoxyl group having less than or equal to 15 carbon atoms, preferably less than or equal to 8 carbon atoms. Typical alkoxides, for example, titanium alkoxides include, without being limited to, tetraethyl titanate Ti(OC$_2$H$_5$)$_4$, tetrabutyl titanate Ti(OC$_4$H$_9$)$_4$, tetraisopropyl titanate Ti(OC$_3$H$_7$)$_4$, dibutoxy di(triethoxy) amino titanate Ti(OC$_4$H$_9$)$_2${(OC$_2$H$_5$)$_3$N}$_2$, dibutoxy di(2-hydroxy-ethylamino)ethoxy titanate Ti(OC$_4$H$_9$)$_2$.[N(C$_2$H$_4$OH)$_2$.(C$_2$H$_4$O)$_2$], etc. For zirconium alkoxides and hafnium alkoxides, similar alkoxides may be used as raw materials.

The B-site elements (i.e., Ti, Zr and Hf) in the perovskite compound expressed by ABO$_3$ may be used in the form of a sol. In this case, it is preferred to use a sol prepared either by hydrolysis of alkoxide or by reaction of water-soluble inorganic compounds of these elements with alkali.

The alkali to be used as the base in the first and second steps includes sodium hydroxide, potassium hydroxide, lithium hydroxide and ammonium hydroxide, which may be expressed by the general formula: M(OH)$_n$ where M is an alkali metal and ammonium group.

Amines to be used as the base in the first and second steps includes aliphatic amine and aromatic amine. Typical aliphatic amine includes methyl amine, ethyl amine, butyl amine, dimethyl amine, trimethyl amine, etc. Typical aromatic amine includes o-. m-, p-toluidine, N, N-dimethyl benzylamine, etc.

Preferred compounds of rare earth elements and manganese to be used in the second step and preferred compounds of calcium and magnesium to be used in the third step are water-soluble compounds, or acid-soluble compounds of these elements which are soluble in nitric acid or acetic acid. Preferred water-soluble compounds of these elements are nitrates, chlorides, hydroxychlorides, acetates and the like. Preferred acid-soluble compounds are those containing no anions which react with internal electrode materials when firing it along with the produced dielectric ceramic material.

The carbonate ions to be used in the third step are preferably introduced into the reaction system by adding at least one alkaline carbonate such as sodium carbonate, potassium carbonate, lithium carbonate, and ammonium carbonate, or by bubbling carbon dioxide into the reaction system.

In the present invention, the first step provides a condensation product with a complex perovskite structure, i.e., a complex perovskite compound, by the following condensation:

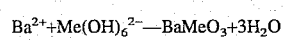

$$Ba^{2+} + Me(OH)_6^{2-} \rightarrow BaMeO_3 + 3H_2O$$

where Me is tetravalent ions of elements of titanium group. Thus, the present invention makes it possible to produce a homogeneous dispersion system, different from the conventional method producing a heterogeneous dispersion system. The additives are respectively precipitated in the form of a complex hydroxide or carbonates by the second and third steps. The resultant precipitates are mixed with the complex perovskite compound by the wet process and the resultant homogeneous mixture is dried and then thermally treated at a temperature ranging from 950° to 1100° C., whereby producing a microscopically homogeneous powder material with good dispersibility.

It is sufficient for the homogeneous mixture to carry out the thermal treatment at a low temperature of 950° to 1100° C., which is lower than the calcining temperature of about 1200° C. and above for the ceramic material powder of the prior art, to convert it to a dielectric ceramic powder material, thus making it possible to prevent consolidated aggregation of particles during thermal treatment, which in turn makes it possible to prevent the produce from contamination with impurities when crushing the clinker after thermal treatment.

Accordingly to the present invention, it is unnecessary to wash the reaction products to remove an excess amount of any constituents from the reaction system of the first step after formation of the complex perovskite compound since all the constituents are precipitated as a complex perovskite compound by mixing barium hydroxide, compounds of B-site elements (i.e., titanium compound, zirconium compound and hafnium compound) and the base in the molar ratios 1:1:1–4.

However, the reaction system of the first step contains a very small amount of barium ions dissolved therein even after formation of the complex perovskite compound. These barium ions may be precipitated as a carbonate by introducing carbonate ions after formation of Ba(Ti$_{1-x-y}$Zr$_x$Hf$_y$)O$_3$ to prevent deviation of the molar ratio of Ba to (Ti+Zr+Hf) from the predetermined or stoichiometric molar ratio of the complex perovskite compound to be produced.

Further, it is also possible to prevent the dielectric ceramic material with the perovskite structure from deviation of the molar ratio of A-site elements to B-site elements (Ti+Zr+Hf) by incorporating titanium ions into the reaction system of the second step in a molar amount corresponding to a sum of the number of moles of rare earth element atoms in the rare earth element compounds used in the second step and the number of moles of Ca and Mg atoms in the Ca and Mg compound to be added in the third step.

The above and other objects, features and advantages of the present invention will become apparent from the following description in connection with several examples.

EXAMPLE 1

As a first step, there was prepared a slurry containing a complex perovskite compound in the following manner: Barium hydroxide, titanium isopropoxide, zirconium butoxide, hafnium butoxide and sodium hydroxide were weighed out by molar amounts shown in Table 1 and dissolved in pure water kept at 90° C. The resultant solution was kept at a temperature of 85°–90° C. for 3 hours with stirring to allow these elements to react with one another to produce a complex peroviskite compound, Ba(Ti,Zr,Hf)O$_3$. Then, sodium carbonate was added to the reaction product in an amount of 5 mol % with respect to the amount of Ba(Ti,Zr,Hf)O$_3$ to recover Ba$^{2+}$ in the solution as barium carbonate by precipitation, thereby preparing a slurry of precipitates of the first step including a complex perovskite compound and a very small amount of barium carbonate.

Separate from the above, erbium nitrate, lanthanum nitrate, manganese nitrate and titanium isopropoxide were weighed out by molar amounts shown in Table 1 and added to pure water with rapid stirring. Among these water soluble compounds, titanium isopropoxide was added to the reaction system to prevent the dielectric ceramic material from deviation of the molar ratio. The added amount of titanium isopropoxide was so determined that it contains titanium atoms in a molar amount corresponding to a sum of the number of moles of rare earth element atoms in the rare earth element compounds used in the second step and the number of moles of Ca and Mg atoms in the Ca and Mg compound to be added in the next third step. The resultant solution was adjusted to pH 10 to 11 by addition of an aqueous solution of sodium hydroxide to form a precipitate of a complex hydroxide.

As a third step, there was prepared carbonate of calcium and magnesium in the following manner: Raw materials, calcium nitrate and magnesium nitrate, were weighed out by amounts shown in Table 1 and dissolved in pure water with rapid stirring. Then, sodium carbonate was added to the resultant solution with rapid stirring in an amount of 5% excess as compared with the sum of the number of moles of calcium nitrate and magnesium nitrate to precipitate calcium and magnesium as carbonates thereof.

The slurry prepared by the first step was heated to and maintained at about 85°–90° C. and then mixed with the precipitated compounds prepared in the second and third steps, i.e., complex hydroxide and a mixture of calcium carbonate and magnesium carbonate. The mixing was carried out by adding the precipitated compounds to the slurry with rapid stirring. The resultant watery mixture or slurry was then cooled to room temperature by stopping heating and allowing it to stand for a certain time. The cooled slurry was dehydrated by a centrifugal separator, washed with pure water repeatedly to remove $Na^+$ ions and then with isopropyl alcohol to replace water with alcohol, and then dried with a hot air drier. The resultant dried powder was calcined at 1000° C. for 3 hours to prepare powder of a dielectric ceramic material.

TABLE 1

| Step | Compound | Specimen No. 1 | Specimen No. 2 |
|---|---|---|---|
| 1 | barium hydroxide | 1.000 | 1.000 |
|   | Titanium isopropoxide | 0.845 | 0.845 |
|   | Zirconium butoxide | 0.155 | 0.130 |
|   | Hafnium butoxide | 0 | 0.25 |
|   | Sodium hydroxide | 2.50 | 2.50 |
| 2 | Erbium nitrate | 0.005 | 0 |
|   | Lanthanum nitrate | 0.001 | 0.006 |
|   | Manganese nitrate | 0.005 | 0.005 |
|   | Titanium isopropoxide | 0.056 | 0.056 |
| 3 | Calcium nitrate | 0.050 | 0.025 |
|   | Magnesium nitrate | 0 | 0.025 |

Using the resultant powder of dielectric ceramic materials, there were prepared multilayered ceramic chip capacitors in the following manner: The powder of dielectric ceramic material was mixed with suitable amounts of a polyvinyl butyral binder and ethyl alcohol, milled with a ball mill for 16 hours to prepare a slurry, and formed into a sheet by the doctor blade process, dried and then cut to prepare green ceramic sheets.

Then, Ag—Pd paste was printed on one flat surface of each green ceramic sheet by screen printing to form a conductive paste layer for internal electrode. Subsequently, the printed green ceramic sheets were stacked one on another so that the paste layers are separated by each ceramic green sheet, pressed and then cut into pieces to form green multilayered ceramic chip capacitors. The green chip capacitors were fired at 1200° C. for 2 hours in air. Each green chip capacitor was provided with external electrodes by applying a silver paste on its opposite sides and then baking it at 800° C. for 30 minutes. There were prepared two kinds of multilayered ceramic capacitors. Each dielectric layer of the resultant multilayered ceramic capacitors has a thickness of 15.5 μm. The composition of dielectric ceramics of specimen No. 1 was:

100 mol % $(Ba_{0.944}Ca_{0.05}Er_{0.005}La_{0.001})(Ti_{0.845}Zr_{0.155})O_3$+0.5 mol % MnO For the resultant multilayered ceramic capacitors, measurements were made on dielectric constant, dielectric loss (tan δ), insulating resistance (IR), and change rate of capacitance on temperature. Dielectric constant (ε) was calculated from a capacitance measured at 20° C. and a curie point under the conditions of 1 KHz and 1 Vrms. The dielectric loss (tan δ) were measured at 20° C. under the conditions of 1 KHz and 1 Vrms. The insulating resistance was measured at 20° C. after applying a DC voltage of 25 V for 2 minutes. The temperature coefficient (TC) of capacitance was determined over the range of −25° C. to 85° C. on the basis of the capacitance at 20° C.

Results are shown in Table 2. In this table, the insulating resistance is given as a logalithimic value thereof and the temperature coefficient (TC) of capacitance is given by symbols for temperature characteristics under standard defined by JIS C 6429.

COMPARATIVE EXAMPLE

Comparative specimens having the same composition as specimen No. 1 of the above Example were prepared by the dry process in the following manner: There were prepared barium carbonate, calcium carbonate, erbium oxide, lanthanum oxide, titanium oxide, zirconium oxide and manganese carbonate. These raw materials were weighed out so that the resulting product has a composition 100 mol % $(Ba_{0.944}Ca_{0.05}Er_{0.005}La_{0.001})(Ti_{0.845}Zr_{0.155})O_3$+0.5 mol % MnO, put into a polyethylene pot along with water and partially-stabilized zirconia balls serving as media, ground for 16 hours, dehydrated and dried. The resultant dried powder was calcined at 1250° C. for 2 hours, ground with the ball-mill in the same manner as above, dehydrated and then dried to prepare powder of a dielectric ceramic material.

Using the resultant power, multilayered ceramic chip capacitors were prepared in the same manner as that of Example and subjected to measurements of electric properties in the same manner as that of Example except for that firing was carried out at 1300° C. The results are shown in Table 2.

TABLE 2

|  | SPECIMEN | | |
|---|---|---|---|
|  | No. 1 | No. 2 | compar. ex. |
| ε at +20° C. | 18520 | 18600 | 18000 |
| ε curie point | 18800 | 18900 | 18200 |
| tan δ (%) | 3.55 | 3.50 | 4.05 |
| Temp characteristic of Capacitance. | F | F | F |
| log IR | 11.15 | 11.25 | 10.90 |
| Firing temp. (°C.) | 1200 | 1200 | 1300 |

As can be seen from the results shown in Table 2, the multilayered ceramic capacitors employing the power produced by the present invention possess good electrical characteristics equal to or superior to that of the multilayered ceramic capacitors of the comparative example even though they were fired at 1200° C. which is lower by 100° C. as compared with the capacitors employing the power produced by the conventional powder method.

What is claimed is:

1. A method for producing dielectric ceramic material powders having a composition composed of a main component of $Ba(Ti_{1-x-y}Zr_xHf_y)O_3$, where $0.05 \leq x \leq 0.25$ and $0 \leq y \leq 0.05$, and containing, as additives, at least one element of calcium and magnesium, at least one rare earth element, and manganese, said method comprising:

a first step of allowing barium hydroxide, at least one titanium compound, at least one zirconium compound and at least one hafnium to react with one another in an aqueous solution at 65° to 95° C. by catalytic actions of a base selected from the group consisting of alkali and amines to form a main component $Ba(Ti_{1-x-y}Zr_xHf_y)O_3$, said at least one titanium compound being selected from the group consisting of hydrolyzable titanium-containing organic compounds, titanium hydroxide and titania sol, said at least one zirconium compound being selected from the group consisting of hydrolyzable zirconium-containing organic compounds, zirconium hydroxide and zirconia sol, said at least one hafnium compound being selected from the group consisting of hydrolyzable hafnium-containing organic compounds, hafnium hydroxide and hafnia sol;

a second step of allowing at least one rare earth element compound and a manganese compound to react with one another in an aqueous solution by catalytic actions of a base selected from the group consisting of alkali and amines to form a complex hydroxide of at least one rare earth element and manganese;

a third step of allowing at least one compound of calcium compounds and magnesium compounds to react with carbonate ions in an aqueous solution to form at least one carbonate of calcium and magnesium;

a fourth step of mixing respective precipitates prepared in said first to third steps by the wet process, drying and then thermally treating the resultant mixture.

2. The method for producing dielectric ceramic material powders according to claim 1 wherein molar ratios of barium hydroxide, a sum of titanium compound, zirconium compound and hafnium compound, and base in the first step is 1:1:1–4.

3. The method for producing dielectric ceramic material powders according to claim 1 wherein the reaction system of the first step is mixed with carbonate ions by addition of at least one alkaline carbonate selected from the group consisting of $Na_2CO_3$, $K_2CO_3$, $Li_2CO_3$ and $(NH_4)_2CO_3$.

4. The method for producing dielectric ceramic material powders according to claim 1 wherein the reaction system of the first step is mixed with carbonate ions by introduction of bubbles of carbon dioxide after precipitating the main component $Ba(Ti_{1-x-y}Zr_xHf_y)O_3$.

5. The method for producing dielectric ceramic material powders according to claim 1 wherein a titanium compound is incorporated into the reaction mixture in the second step to allow it to react with alkali to form a complex hydroxide along with rare earth element and manganese, said titanium compound being added so that it contains titanium atoms corresponding to a sum of the number of moles of rare earth element atoms in the rare earth element compounds used in the second step and the number of moles of Ca and Mg atoms in the Ca and Mg compound to be added in the third step.

6. The method for producing dielectric ceramic material powders according to claim 1 wherein the dried mixture prepared in the fourth step is thermally treated at a temperature ranging from 950° to 1100° C.

7. The method for producing dielectric ceramic material powders according to claim 1 wherein the compounds of Ti, Zr and Hf are used in the form of a sol prepared either by hydrolysis of alkoxide or by reaction of water-soluble inorganic compounds of these elements with alkali.

8. The method for producing dielectric ceramic material powders according to claim 1 wherein the base used in the first and second steps is at least one compound selected from the group consisting of sodium hydroxide, potassium hydroxide, lithium hydroxide, ammonium hydroxide, and amines.

9. The method for producing dielectric ceramic material powders according to claim 1 wherein said compounds of rare earth elements and manganese used in the second step are water-soluble compounds, or acid-soluble compounds of these elements which are soluble in nitric acid or acetic acid.

10. The method for producing dielectric ceramic material powders according to claim 1 wherein said compounds of calcium and magnesium to be used in the third step are water-soluble compounds, or acid-soluble compounds of these elements which are soluble in nitric acid or acetic acid.

11. The method for producing dielectric ceramic material powders according to claim 1 wherein said carbonate ions used in the third step are introduced into the reaction system by adding at least one alkaline carbonate such as sodium carbonate, potassium carbonate, lithium carbonate, and ammonium carbonate.

12. The method for producing dielectric ceramic material powders according to claim 1 wherein said carbonate ions used in the third step are introduced into the reaction system by bubbling carbon dioxide into the reaction system.

* * * * *